US006825243B2

(12) United States Patent
Ohno et al.

(10) Patent No.: US 6,825,243 B2
(45) Date of Patent: Nov. 30, 2004

(54) ACTIVE ENERGY RAY-CURABLE URETHANE (METH)ACRYLATE AND ACTIVE ENERGY RAY-CURABLE COMPOSITION, AND USES THEREOF

(75) Inventors: Tomihisa Ohno, Nagoya (JP); Masahiro Hara, Nagoya (JP); Shigekazu Teranishi, Nagoya (JP); Susumu Kawakami, Nagoya (JP)

(73) Assignee: Natoco Co., Ltd., Aichi (JP)

( * ) Notice: Subject to any disclaimer, the term of this patent is extended or adjusted under 35 U.S.C. 154(b) by 88 days.

(21) Appl. No.: 10/220,369

(22) PCT Filed: Dec. 26, 2001

(86) PCT No.: PCT/JP01/11464

§ 371 (c)(1),
(2), (4) Date: Aug. 28, 2002

(87) PCT Pub. No.: WO02/053619

PCT Pub. Date: Jul. 11, 2002

(65) Prior Publication Data

US 2003/0162860 A1 Aug. 28, 2003

(30) Foreign Application Priority Data

Dec. 28, 2000 (JP) ........................................ 2000-400729
May 25, 2001 (JP) ........................................ 2001-157734

(51) Int. Cl.$^7$ ................................................. C08F 2/46
(52) U.S. Cl. ........................... 522/97; 522/90; 522/96; 522/134; 522/135; 522/142; 522/144; 522/150; 522/152; 522/153; 522/173; 522/174; 522/178; 522/182
(58) Field of Search ........................ 522/90, 96, 97, 522/134, 135, 142, 144, 150, 152, 153, 173, 174, 178, 182

(56) References Cited

U.S. PATENT DOCUMENTS

| | | | | |
|---|---|---|---|---|
| 5,619,288 A | * | 4/1997 | White, Jr. et al. | 351/159 |
| 5,719,227 A | * | 2/1998 | Rosenberry et al. | 524/590 |
| 5,843,576 A | * | 12/1998 | Rosenberry et al. | 428/423.1 |

FOREIGN PATENT DOCUMENTS

| | | | | |
|---|---|---|---|---|
| JP | 64-040906 | | 2/1989 | ........................ 5/2 |
| JP | 03-145602 | | 6/1991 | ........................ 1/10 |
| JP | 05009859 | * | 1/1993 | ........... C08G/18/67 |
| JP | 07-027902 | | 1/1995 | ........................ 1/11 |
| JP | 09-015404 | | 1/1997 | ........................ 5/2 |
| JP | 2001-074909 | | 2/2001 | ........................ 1/11 |
| JP | 2001-002744 | | 9/2001 | ........................ 299/6 |

OTHER PUBLICATIONS

Hawley's Condensed Chemical Dictionary, Richardl .Lewis, Sr. 13$^{th}$ Ed. p 896.*

* cited by examiner

Primary Examiner—James J. Seidleck
Assistant Examiner—Sanza L. McClendon
(74) Attorney, Agent, or Firm—Robert D. Buyan; Stout, Uxa, Buyan & Mullins, LLP

(57) ABSTRACT

Provided are an active energy ray-curable urethane (meth)acrylate and an active energy ray-curable composition for paints and coating agents having abrasion resistance and lubricity, and uses thereof. The curable urethane (meth)acrylate has a long chain alkyl group having 13 to 25 carbon atoms and an active energy ray-curable functional group and is modified with polycaprolactone. The urethane (meth)acrylate is obtainable by reacting an organic isocyanate having three or more isocyanate groups in one molecule, a long chain alkyl alcohol, and a polycaprolactone-modified hydroxyethyl (meth)acrylate. On the other hand, the active energy ray-curable composition contains the urethane (meth)acrylate.

12 Claims, 1 Drawing Sheet

ACTIVE ENERGY RAY-CURABLE URETHANE (METH)ACRYLATE AND ACTIVE ENERGY RAY-CURABLE COMPOSITION, AND USES THEREOF

BACKGROUND OF THE INVENTION

The present invention relates to an active energy ray-curable urethane (meth)acrylate and an active energy ray-curable composition.

As conventional coating agents and paints having abrasion resistance, ultraviolet curable hard coating agents, electron beam-curable hard coating agents, silica-type hard coating agents, and two-pack type acrylurethane soft paints are known. As conventional paints and coating agents having lubricity, those obtainable by crosslinking polydimethylsiloxane graft compounds or block copolymers with an isocyanate or melamine are known.

However, in the conventional hard coating agents, crosslinking density of the hard coating agents is increased by employing a rigid monomer. The hard coating agents form coated films through curing but the coated films shrink during their curing to cause a relatively large strain. Therefore, the coated films derived from the conventional hard coating agents exhibit a low adhesiveness to a substrate and also chipping and cracks tend to occur in the coated films.

The conventional hard coating agents form hard and brittle coated films. Therefore, in light-diffusive sheets produced by applying the hard coating agents onto a substrate sheet made of a plastic, it becomes difficult to subject the light-diffusive sheets to secondary processing. Moreover, at the time when the conventional hard coating agents are applied onto a substrate sheet, the substrate sheets curl and hence cracks tend to occur at the resulting coated films.

On the other hand, in a conventional two-pack type acrylurethane soft paint, there occurs no problem such as chipping and cracks. However, the two-pack type acrylurethane soft paint exhibits poor workability because the period of time capable of applying the paint is limited and it takes a long time to cure it by drying. Furthermore, the coated film formed from the two-pack type acrylurethane soft paint is poor in solvent resistance and blocking resistance. When polydimethylsiloxane oil is added in order to improve blocking resistance, transparency of the coated film, adhesiveness to a substrate, and re-coating properties decrease.

In addition, the conventional paints and coating agents are very excellent in lubricity but it is impossible to re-coat a silk printing on coated films thereof.

BRIEF SUMMARY OF THE INVENTION

An object of the present invention is to provide an active energy ray-curable urethane (meth)acrylate and active energy ray-curable composition which have an enhanced abrasion resistance and lubricity and are suitably usable as a paint or coating agent. Another object of the present invention is to provide uses of the urethane(meth)acrylate and the composition.

For achieving the above objects, in one embodiment of the present invention, provided is an active energy ray-curable urethane (meth)acrylate which has an alkyl group having 13 to 25 carbon atoms and an active energy ray-curable functional group and is modified with polycaprolactone.

The active energy ray-curable urethane (meth)acrylate is obtainable by reacting an organic isocyanate having three or more isocyanate groups in one molecule, an alkyl alcohol having 13 to 25 carbon atoms, and a polycaprolactone-modified hydroxyethyl (meth)acrylate.

It is preferred that the molar ratio of the isocyanate group of the organic isocyanate, the hydroxyl group of the polycaprolactone-modified hydroxyethyl (meth)acrylate, and the hydroxyl group of the alkyl alcohol is 1:0.8 to 1.20:0.02 to 0.33.

In another embodiment of the present invention, an active energy-ray curable composition is provided. The composition comprises an active energy ray-curable urethane (meth)acrylate with an alkyl group having 13 to 25 carbon atoms and an active energy ray-curable functional group and is modified with polycaprolactone, and at least one selected from a compound having an active energy ray-curable functional group copolymerizable with the urethane (meth)acrylate, organic beads, inorganic beads, and an antistatic agent.

The other embodiments and advantages of the present invention may become apparent from the following description along with the drawings illustrating the examples of principle of the present invention.

DETAILED DESCRIPTION OF THE PREFERRED EMBODIMENTS

Figure 1:
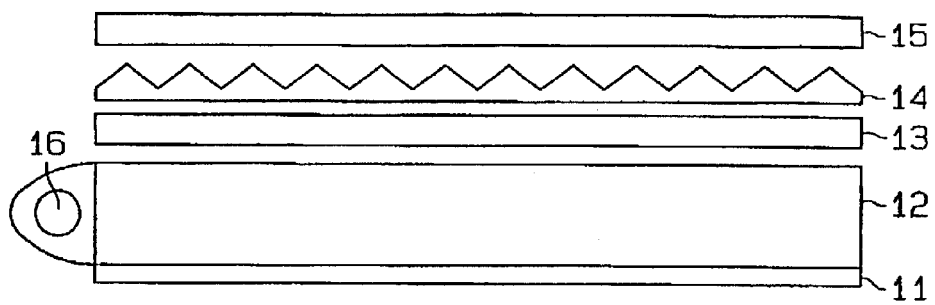
FIG. 1 is a schematic diagram of a back light unit for liquid crystal display using a light-diffusive sheet according to one embodiment of the present invention.

The following will explain one embodiment of the active energy ray-curable urethane (meth)acrylate (hereinafter, referred to as curable urethane (meth)acrylate) of the present invention.

The curable urethane (meth)acrylate (A) has a long chain alkyl group having 13 to 25 carbon atoms and an active energy ray-curable functional group such as terminal methylene group ($CH_2=$) and is modified with polycaprolactone. The curable urethane (meth)acrylate is cured by the irradiation with an active energy ray. The curable urethane (meth)acrylate is prepared by reacting an organic isocyanate (B) having three or more isocyanate groups in one molecule, a long-chain alkyl alcohol (C) having 13 to 25 carbon atoms, and a polycaprolactone-modified hydroxyethyl (meth)acrylate (D).

The organic isocyanate (isocyanate prepolymer compound) (B) is obtained by modifying a diisocyanate monomer (b) having two isocyanate groups. The diisocyanate monomer (b) is modified according to a modification method such as isocyanurate modification, adduct modification, or biuret modification.

Examples of the diisocyanate monomer (b) include tolylene diisocyanate (TDI) represented by the following formula (1):

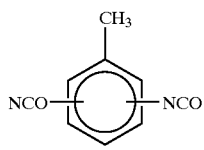

(1)

naphthalene diisocyanate (NDI) represented by the following formula (2):

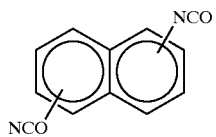

(2)

diphenylmethane diisocyanate (MDI) represented by the following formula (3):

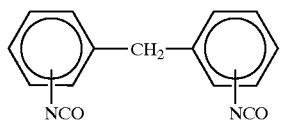

(3)

isophorone diisocyanate (IPDI) represented by the following formula (4):

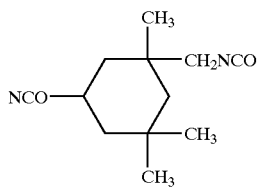

(4)

xylylene diisocyanate (XDI) represented by the following formula (5):

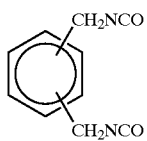

(5)

hexamethylene diisocyanate (HDI) represented by the following formula (6):

(6)

dicyclohexylmethane diisocyanate (H-MDI) represented by the following formula (7):

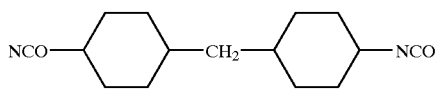

(7)

2,2,4-trimethylhexamethylene diisocyanate, lysine diisocyanate, and norbornane diisocyanate methyl.

Examples of the organic isocyanate (B) subjected to isocyanurate modification include the compounds represented by the following general formula (8):

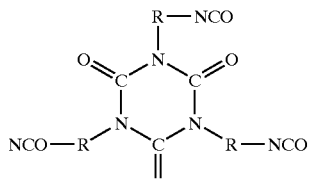

(8)

R represents 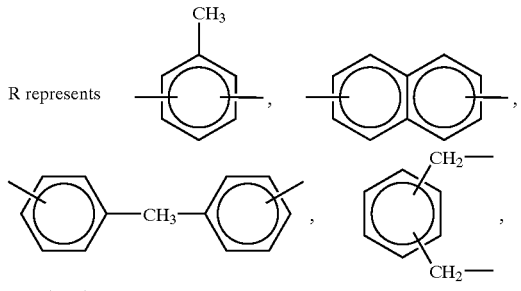

Examples of the organic isocyanate (B) subjected to adduct modification include the compounds represented by the following general formula (9).

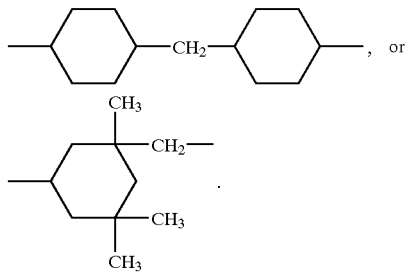

(9)

R has the same meaning as defined in the general formula (8).

Examples of the organic isocyanate (B) subjected to biuret modification include the compounds represented by the following general formula (10):

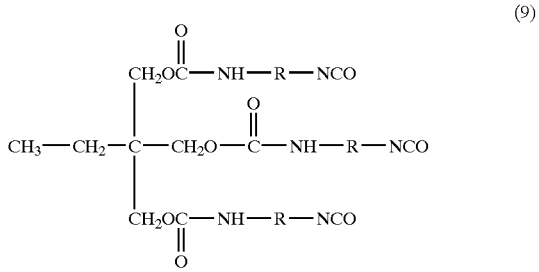

(10)

Examples of the long-chain alkyl alcohol (C) include alcohols having a long-chain alkyl group of 13 to 25 carbon atoms such as tridecanol, myristyl alcohol, cetyl alcohol, stearyl alcohol, behenyl alcohol, polyoxyethylene monostearate, polyoxyethylene cetyl ether, polyoxyethylene stearyl ether, and glycerol monostearate.

The polycaprolactone-modified hydroxyethyl (meth) acrylate (D) has an active energy ray-curable functional group such as terminal methylene group ($CH_2$=) as shown in the following general formula (11) and is reactive with an isocyanate group.

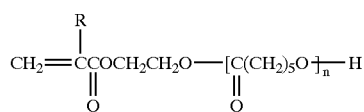

(11)

R represents H or $CH_3$, and n is an integer of 1 to 25

In the general formula (11), n is an integer of 1 to 25, preferably an integer of 2 to 5. When n is an integer of 2 to 5, the curable urethane (meth)acrylate and the composition having the curable urethane (meth)acrylate are crosslinked with a relatively low molecular weight component, so that insufficient curing is suppressed and also satisfactory abrasion resistance and self-repairing function are exhibited.

The following will explain the synthesis method of the curable urethane (meth)acrylate.

First, an organic isocyanate (B) having three or more isocyanate groups in one molecule is mixed and reacted with a long-chain alkyl alcohol (C) (a first step). To the reaction product is added a polycaprolactone-modified hydroxyethyl (meth)acrylate (D) and the mixture is reacted (a second step). Thus, the curable urethane (meth)acrylate is obtained.

Each reaction of the first step and the second step can be carried out in a solution, and an aromatic hydrocarbon solvent such as toluene or xylene, a ketone solvent such as acetone, methyl ethyl ketone, methyl isobutyl ketone, or cyclohexanone, an ester solvent such as ethyl acetate, propyl acetate, isobutyl acetate, or butyl acetate, or the like can be used singly or as a mixed solvent.

Each reaction of the first step and the second step may be also carried out in a system without solvent or in a compound having an active energy ray-curable functional group, such as styrene, isobornyl acrylate, acryloylmorpholine, diethylene glycol diacrylate, or triethylene glycol diacrylate.

The reaction temperature of the first step or the second step is preferably from room temperature to 100° C., and the reaction time is preferably from 1 to 10 hours.

The organic isocyanate (B), the polycaprolactone-modified hydroxyethyl (meth)acrylate (D), and the long-chain alkyl alcohol (C) are preferably mixed so that the molar ratio of the isocyanate group of the organic isocyanate (B), the hydroxyl group of the polycaprolactone-modified hydroxyethyl (meth)acrylate (D), and the hydroxyl group of the long-chain alkyl alcohol (C) becomes 1:0.8 to 1.20:0.02 to 0.33.

In the synthesis reaction of the urethane (meth)acrylate, a catalyst such as dibutyltin dilaurate, dibutyltin diethylhexoate, or dibutyltin sulfite may be used. The amount of the catalyst to be added is preferably from 0.01 to 1 part by weight, more preferably 0.1 to 0.5 parts by weight relative to the total weight of other raw materials. Moreover, a polymerization inhibitor such as hydroquinone monomethyl ether may be used. The amount of the polymerization inhibitor to be added is preferably from 0.01 to 1 part by weight relative to the total weight of other raw materials.

The following will explain the active energy ray-curable composition (hereinafter referred to as curable composition). The essential component of this embodiment of the curable composition is the curable urethane (meth) acrylate. The curable composition includes a compound (E) having an active energy ray-curable functional group, beads (F), an antistatic agent (G), a photo-initiator (H), and other additives (I) as optional components.

The compound (E) having an active energy ray-curable functional group has an active energy ray-curable functional group and is a compound copolymerizable with the curable urethane (meth)acrylate. Examples thereof include monofunctional or polyfunctional monomers and oligomers each having (meth)acryloyl group in the molecule. As such monomers and oligomers, commercially available compounds may be also employed.

Examples of the compound (E) include monofunctional monomers such as phthalic acid monohydroxyethyl acrylate, 2-ethylhexyl acrylate, phenoxyethyl acrylate, 2-ethoxyethyl acrylate, 2-ethoxylethoxyethyl acrylate, 2-hydroxyethyl acrylate, 2-hydroxypropyl acrylate, polycaprolactone-modified hydroxyethyl acrylate, dicyclopentenyloxyethyl acrylate, N-vinylpyrrolidone, acryloylmorpholine, isobornyl acrylate, vinyl acetate, and styrene; difunctional monomers such as neopentyl glycol diacrylate, 1,9-nonanediol diacrylate, 1,6-hexanediol diacrylate, 1,4-butanediol diacrylate, diethylene glycol diacrylate, triethylene glycol diacrylate, propylene glycol diacrylate, and dipropylene glycol diacrylate; polyfunctional monomers such as trimethylolpropane triacrylate, pentaerythritol triacrylate, triacrylate of 3 mol propylene oxide adduct of trimethylolpropane, triacrylate of 6 mol ethylene oxide adduct of trimethylolpropane, glycerolpropoxy triacrylate, dipentaerythritol hexaacrylate, and hexaacrylate of caprolactone adduct of dipentaerythritol.

In addition, examples of the compound (E) include oligomers such as unsaturated polyesters, polyester acrylates, polyether acrylates, acryl acrylates, urethane acrylates, and epoxy acrylates.

As the beads (F), organic or inorganic beads may be employed. Examples thereof include organic beads each made of a synthetic resin such as polymethyl methacrylate (PMMA), nylon, or polyurethane or a rubber. Also, examples include inorganic beads each made of a metal such as titanium oxide, titanium dioxide, aluminum oxide, tin oxide, indium oxide, zinc oxide, antimony oxide, tin oxide containing antimony, or indium oxide containing tin, or silicon dioxide or glass. The shape of the beads is preferably indefinite form or spherical form. Suitable material and size of the beads vary depending on the uses. For example, since beads each made of PMMA, titanium oxide, or silicon dioxide diffuse light uniformly, they can be used for the curable composition for the light-diffusive sheet 13 (upper surface) in FIG. 1. Of these, beads having an average particle size of 3 to 10 μm and made of PMMA are preferred because of relatively high light transmittance. Beads made of PMMA, nylon, polyurethane, or silicon dioxide can be employed for the curable composition for the protective diffusive sheet 15 (lower surface) in FIG. 1. Of these, beads having an average particle size of 3 to 10 μm and made of PMMA, nylon or polyurethane are preferred because they effectively prevent the sticking to the adjacent prism sheet 14. Beads made of PMMA, titanium oxide, or silicon dioxide can be employed for the curable composition for the protective diffusive sheet 15 (upper surface). Of these, beads having an average particle size of 3 to 10 μm and made of PMMA are preferred because they change the output direction of light and improve brilliance. Moreover, beads made of tin oxide, indium oxide, antimony oxide, tin oxide containing antimony, or indium oxide containing tin can impart an antistatic effect to the curable composition and cured product thereof. Preferred average particle size of the beads is from 20 to 60 nm.

Examples of the antistatic agent (G) include anionic antistatic agents such as alkyl phosphates, cationic antistatic agents such as quaternary ammonium salts, nonionic antistatic agents such as polyoxyethylene alkyl ethers, and antistatic agents containing salts of an alkali metal such as lithium, sodium, or potassium. Of these, an antistatic agent containing a lithium salt is preferred.

Examples of the photo-initiator (H) include isopropyl benzoin ether, isobutyl benzoin ether, benzophenone, Michler's ketone, o-benzoylmethyl benzoate, acetophenone, 2,4-diethylthioxanthone, 2-chlorothioxanthone, ethylanthraquinone, isoamyl p-dimethylaminobenzoate, ethyl p-dimethylaminobenzoate, 1-hydroxycyclohexyl phenyl ketone (e.g., "IRGACURE 184", a trade name of Ciba-Geigy Corp.), 2-hydroxy-2-methyl-1-phenyl-propan-1-one (e.g., "DAROCURE 1173", a trade name of Ciba-Geigy Corp.), 2,2-dimethoxy-1,2-diphenylethan-1-one (e.g., "IRGACURE 651", a trade name of Ciba-Geigy Corp.), 2-benzyl-2-dimethylamino-1(4-morpholinophenyl)-butanone-1, bis(2,4,6-trimethylbenzoyl)-phenylphosphine oxide, and methyl benzyl formate.

Other additives (I) include a solvent, a leveling agent, an ultraviolet absorber, and the like. Example of the solvent include aromatic hydrocarbon solvents such as toluene and xylene; alcohol solvents such as methanol, ethanol, isopropyl alcohol, n-butanol, and isobutanol; ketone solvents such as acetone, methyl ethyl ketone, methyl isobutyl ketone, and cyclohexanone; ester solvents such as ethyl acetate, propyl acetate, butyl acetate, and isobutyl acetate, and these solvents may be used singly or as a mixed solvent. Examples of the leveling agent include acrylic copolymers and silicone leveling agents and fluorine leveling agents. Examples of the ultraviolet absorber include benzophenone-type, benzotriazole-type, oxalic anilide-type, triazine-type and hindered amine-type ultraviolet absorbers.

The curable composition is produced as follows.

The curable composition is produced by suitably mixing an essential component of the curable urethane (meth) acrylate with optional components (E), (F), (G), (H), and (I).

The compound (E) having an active energy ray-curable functional group is preferably mixed in the ratio of the curable urethane (meth)acrylate to the compound (E) having an active energy ray-curable functional group of 30 to 90:5 to 35 as the ratio of solids (weight).

The beads (F) are preferably mixed in an amount of 0.01 to 100 parts by weight relative to 100 parts by weight of the components other than the beads (F) in the curable composition.

The antistatic agent (G) is preferably mixed in an amount of 0.1 to 10 parts by weight relative to 100 parts by weight of the components other than the antistatic agent (G) in the curable composition.

The photo-initiator (H) is preferably mixed so that the weight ratio of the curable urethane (meth)acrylate: the compound (E) having an active energy ray-curable functional group: the photo-initiator (H) becomes 100:10 to 300:1 to 20.

The curable urethane (meth)acrylate and the curable composition can be suitably used as paints or coating agents, and more specifically, they are applied onto the surfaces of electrical or electronic apparatus such as cell phones, watches, compact discs, audio equipments, office automation equipments; electronic material parts such as touch panels, antireflection board for cathode ray tube; household electrical goods such as refrigerators, vacuum cleaners, and microwave ovens; interior of automobiles such as meter panels and dashboards; pre-coated metal steel plates; bodies, bumpers, spoilers, door knobs, handles, and head lamps of automobile, and fuel tanks of motorcycles; automobile parts such as plated, deposited, or sputtered aluminum wheels and door mirrors of automobiles; roofs of carports and roofs for natural lighting; molded products, films, and sheets of plastics such as polyvinyl chloride, acrylic resin, polyethylene terephthalate (PET), polycarbonate, and ABS resin; wood products such as stairs, floors, tables, chairs, chests, and other furniture; sheet materials such as fabrics and paper.

The curable urethane (meth)acrylate and the curable composition are applied (painting or coating) according to known methods, for example, air spraying, airless spraying, electrostatic coating, roll coater, flow coater, and spin coating. It should be noted that the thickness of the coated film is preferably from about 1 to 100 $\mu$m.

After being applied onto a substrate, the curable urethane (meth)acrylate and the curable composition are cured by irradiation with an active energy ray such as an ultraviolet light or an electron beam. The irradiation with an ultraviolet light is preferably conducted using a UV light source such as a mercury lamp or a metal halide lamp so that the curing energy (integral light intensity) becomes from 100 to 1000 mJ/cm$^2$. The irradiation with an electron beam is preferably conducted at an accelerating voltage of 150 to 250 keV so that the dose becomes from 1 to 5 Mrad.

The following will explain a functional material. The functional material in this embodiment is a material cured by irradiating the curable urethane (meth)acrylate or the curable composition with an active energy ray such as an ultraviolet light or an electron beam, and has a self-repairing function. Preferred irradiation conditions at the irradiation with an active energy ray are the same as the aforementioned irradiation conditions. The functional material, i.e., a cured curable urethane (meth)acrylate or curable composition can be employed in a wide range of uses.

A light-diffusive sheet will be explained below. The light-diffusive sheet in this embodiment is the sheet having a cured layer made of the curable urethane (meth)acrylate or the curable composition on the surface of a substrate sheet. The light-diffusive sheet can diffuse uniformly a light emitted from a light source, and can be used for liquid crystal displays, illuminating materials, advertising displays and the like. It should be noted that as the substrate sheet, a sheet or film made of a synthetic resin or a glass plate can be employed. Preferred substrate sheet is a relatively highly transparent PET, polycarbonate or glass.

FIG. 1 illustrates a back light unit for liquid crystal display using a light-diffusive sheet. In the back light unit, a reflective sheet 11, a light-conducting plate 12, a first light-diffusive sheet 13, a prism sheet 14, and a protective diffusive sheet (a second light-diffusive sheet) 15 are laminated successively from the back surface of the back light unit (lower part of FIG. 1). On the upper surface of the second light-diffusive sheet 15, a liquid crystal layer (not shown) is arranged. At the one end of the light-conducting plate 12, a light source (lamp) 16 is arranged. A light emitted from the lamp 16 enters the light-conducting plate 12, is reflected by the reflective sheet 11, and exits from the surface of the light-conducting plate 12, and the light finally reaches the liquid crystal layer (not shown) after passing through the first light-diffusive sheet 13, the prism sheet 14, and the second light-diffusive sheet 15, successively. The second light-diffusive sheet 15 has functions of diffusing the light, protecting the prism sheet 14, and preventing the dazzle of the prism sheet 14.

Figure 2:
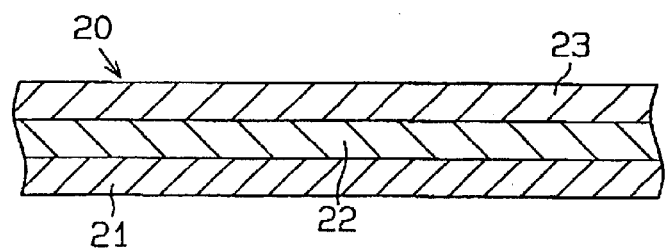
FIG. 2 is a cross-sectional view of an antireflection film according to one embodiment of the present invention.

The following will explain an antireflection film. FIG. 2 illustrates an antireflection film 20 in this embodiment. The antireflection film 20 contains a substrate film 21, a cured layer 22 comprising the curable urethane (meth)acrylate or the curable composition provided on the substrate film 21, and an antireflection layer 23 provided on the cured layer 22.

As the substrate film 21, a film or sheet made of a synthetic resin or a glass plate can be employed. Of these, preferred is one made of PET, acrylic resin, polycarbonate or glass in view of transparency.

The curable composition for forming the cured layer 22 preferably contains at least one selected from a compound (E) having an active energy ray-curable functional group, beads (F), a leveling agent, and an antifoaming agent. The compound (E) lowers the viscosity of the curable composition and makes the composition high-solid. Moreover, the compound improves the adhesiveness to the substrate film 21 and water resistance of the layer 22. The beads (F) enhance the refractive index and thereby improve the antireflective effect of the antireflection film 20. The beads made of titanium oxide, titanium dioxide, or zinc oxide can be employed for the composition for the cured layer 22. Of these, beads having an average particle size of 10 to 100 nm and made of titanium dioxide are preferred because of a relatively high antireflective effect. The leveling agent improves leveling property of the curable composition. The antifoaming agent enhances antifoaming property of the curable composition.

The antireflection layer 23 is formed from a material having a relatively low refractive index, such as an amorphous fluorine-containing polymer.

The curable urethane (meth)acrylate, the curable composition, the functional material, the light-diffusive sheet, and the antireflection film of this embodiment have the following advantages.

(1) The curable urethane (meth)acrylate and the curable composition of this embodiment have an excellent abrasion resistance and lubricity, so that they can be suitably used as paints or coating agents for the products wherein abrasion resistance and lubricity are required.

(2) The curable urethane (meth)acrylate and the curable composition exhibit a small strain caused by shrinkage at curing as compared with the conventional ultraviolet-curable hard coating agent, electron beam-curable hard coating agent, and silica-type hard coating agent. Therefore, a coated film having some flexibility is formed from the curable urethane (meth)acrylate and the curable composition which reduce the lowering of adhesiveness to a substrate and the occurrence of chipping and cracks, so that secondary processing of the substrate can be relatively easily carried out. Moreover, the curling of a relatively thin substrate such as a plastic sheet is inhibited.

(3) The curable urethane (meth)acrylate and the curable composition are one-pack type paints or coating agents, so that they have no limitation on usable period of time contrary to the conventional two-pack type acrylic urethane soft paints and are cured within a relatively short period. Therefore, the efficiency of applying operation is improved.

(4) The coated film obtained from the curable urethane (meth)acrylate or the curable composition has a satisfactory transparency, solvent resistance, blocking resistance, and re-coating property.

(5) The incorporation of the compound (E) having an active energy ray-curable functional group lowers the viscosity of the curable composition and makes the composition high-solid. By using such composition, a coated film having excellent adhesiveness to the substrate and solvent resistance is obtained.

(6) The curable composition containing the beads (F) can improve an antireflective effect of the antireflection film.

(7) By incorporating the antistatic agent (G), a curable composition having an antistatic effect can be obtained.

(8) By using the curable composition of this embodiment, a functional material, photo-diffusive sheet, and antireflection film having the advantages of the above (1) to (7) can be obtained.

It should be noted that the above embodiment of the present invention may be changed as follows.

A diisocyanate may be reacted with a long-chain alkyl alcohol (C) and a polycaprolactone-modified hydroxyethyl (meth)acrylate (D) to obtain a curable urethane (meth)acrylate.

A long-chain alkyl alcohol (C) subjected to polyether modification may be employed. In this case, the antistatic effect of the curable composition is enhanced.

The antireflection film 20 has a single layered antireflection layer 23, but the antireflection film 20 may contain an antireflection layer 23 comprising a plurality of layers having different refractive indices (a first antireflection layer having a high refractive index and a second antireflection layer having a low refractive index). For example, a first antireflection layer containing titanium dioxide may be formed on the layer 22 and a second antireflection layer comprising a fluorine-containing polymer may be formed on the first antireflection layer. In this case, the antireflective effect of the antireflection film is enhanced.

An over-coating layer may be further formed on the antireflection layer 23 of the antireflection film 20. The antireflection layer 23 can be protected by the over-coating layer to prevent the antireflection layer from fouling.

EXAMPLES

The following will explain the above embodiment of the present invention by way of Examples and Comparative Examples. "Part(s)" means "part(s) by weight".

Synthesis Example 1

Into a 500 ml volume flask equipped with a stirrer, a thermometer, and a condenser were charged 57.7 parts of toluene and 9.7 parts of stearyl alcohol ("NAA-46", a trade name of NOF Corporation, hydroxyl value: 207), followed by heating of the mixture to 40° C. After the confirmation of thorough dissolution of stearyl alcohol, 25 parts of hexamethylene diisocyanate (manufactured by Tokyo Kasei Kogyo Co., Ltd.) were charged and the mixture was heated to 70° C. After 30 minutes of the reaction at 70° C., 0.02 parts of dibutyltin laurate were charged. After the mixture was maintained at the same temperature for 3 hours, 100 parts of polycaprolactone-modified hydroxyethyl acrylate ("PLACCEL FA2D", a trade name of Daicel Chemical Industries, Ltd., hydroxyl value: 163), 0.02 parts of dibutyltin laurate, and 0.02 parts of hydroquinone monomethyl ether were charged and the mixture was maintained at 70° C. for 3 hours to complete the reaction. By adding 77 parts of toluene, a urethane acrylate containing 50% by weight of solid was obtained.

Synthesis Example 2

Into a flask similar to the flask in Synthesis Example 1 were charged 60.8 parts of toluene and 8.4 parts of stearyl alcohol (NAA-46), followed by heating of the mixture to 40° C. After the confirmation of thorough dissolution of stearyl alcohol, 50 parts of hexamethylene diisocyanate subjected to isocyanurate modification ("TAKENATE D-170N" a trade name of Takeda Chemical Industries, Ltd., NCO %: 20.9) were charged and the mixture was heated to 70° C. After 30 minutes of the reaction at the same temperature, 0.02 parts of dibutyltin laurate was charged. After the mixture was maintained at the same temperature for 3 hours, 83.5 parts of polycaprolactone-modified hydroxyethyl acrylate (PLACCEL FA2D), 0.02 parts of dibutyltin laurate, and 0.02 parts of hydroquinone monomethyl ether were charged. The mixture was maintained at 70° C. for 3 hours to complete the reaction, and 81.1 parts of toluene were added to obtain a urethane acrylate containing 50% by weight of solid.

Synthesis Example 3

Into a flask similar to the flask in Synthesis Example 1 were charged 48.2 parts of toluene and 4.2 parts of stearyl alcohol (NAA-46), followed by heating of the mixture to 40° C. After the confirmation of thorough dissolution of stearyl alcohol, 50 parts of hexamethylene diisocyanate subjected to isocyanurate modification (TAKENATE D-170N) were charged and the mixture was heated to 70° C. After 30 minutes of the reaction at the same temperature, 0.02 parts of dibutyltin laurate were charged. After the mixture was maintained at the same temperature for 3 hours, 83.3 parts of polycaprolactone-modified hydroxyethyl acrylate ("PLACCEL FA5", a trade name of Daicel Chemical Industries, Ltd., hydroxyl value: 81.8), 0.02 parts of dibutyltin laurate, and 0.02 parts of hydroquinone monomethyl ether were charged. The mixture was maintained at 70° C. for 3 hours to complete the reaction, and 64.2 parts of toluene were added to obtain a urethane acrylate containing 50% by weight of solid.

Synthesis Example 4

Into a flask similar to the flask in Synthesis Example 1 were charged 60.8 parts of toluene and 8.4 parts of stearyl alcohol (NAA-46), followed by heating of the mixture to 40° C. After the confirmation of thorough dissolution of stearyl alcohol, 50 parts of hexamethylene diisocyanate subjected to isocyanurate modification (TAKENATE D-170N) were charged and the mixture was heated to 70° C. After 30 minutes of the reaction at the same temperature, 0.02 parts of dibutyltin laurate were charged. After 3 hours of maintenance at the same temperature, 28 parts of 2-hydroxyethyl acrylate (HEA), 0.02 parts of dibutyltin laurate, and 0.02 parts of hydroquinone monomethyl ether were charged. The mixture was maintained at 70° C. for 3 hours to complete the reaction, and 25.6 parts of toluene were added to obtain a urethane acrylate containing 50% by weight of solid.

Synthesis Example 5

Into a flask similar to the flask in Example 1 were charged 78.3 parts of toluene and 8.5 parts of stearyl alcohol (NAA-46), followed by heating of the mixture to 40° C. After the confirmation of thorough dissolution of stearyl alcohol, 50 parts of hexamethylene diisocyanate subjected to biuret modification ("DURANATE 24A-90CX" a trade name of Asahi Kasei Corporation, N.V.: 90, NCO %: 21.2) were charged and the mixture was heated to 70° C. After 30 minutes of the reaction at the same temperature, 0.02 parts of dibutyltin laurate were charged. After the mixture was maintained at the same temperature for 3 hours, 140.8 parts of polycaprolactone-modified hydroxyethyl acrylate ("PLACCEL FA4", a trade name of Daicel Chemical Industries, Ltd., hydroxyl value: 98), 0.02 parts of dibutyltin laurate, and 0.02 parts of hydroquinone monomethyl ether were charged. The mixture was maintained at 70° C. for 3 hours to complete the reaction, and 111 parts of toluene were added to obtain a urethane acrylate containing 50% by weight of solid.

Synthesis Example 6

Into a flask similar to the flask in Synthesis Example 1 were charged 33 parts of toluene and 4.8 parts of stearyl alcohol (NAA-46), followed by heating of the mixture to 40° C. After the confirmation of thorough dissolution of stearyl alcohol, 50 parts of hexamethylene diisocyanate subjected to trimethylol-propane adduct modification ("BURNOCK DN-950" a trade name of Dainippon Ink & Chemicals Incorporated, N.V.: 75, NCO %: 12) were charged and the mixture was heated to 70° C. After 30 minutes of the reaction at the same temperature, 0.02 parts of dibutyltin laurate were charged. After the mixture was maintained at the same temperature for 3 hours, 63.9 parts of polycaprolactone-modified hydroxyethyl acrylate ("PLACCEL FA3", a trade name of Daicel Chemical Industries, Ltd., hydroxyl value: 122), 0.02 parts of dibutyltin laurate, and 0.02 parts of hydroquinone monomethyl ether were charged. The mixture was maintained at 70° C. for 3 hours to complete the reaction, and 60.7 parts of toluene were added to obtain a urethane acrylate containing 50% by weight of solid.

Synthesis Example 7

Into a flask similar to the flask in Synthesis Example 1 were charged 44.8 parts of toluene and 4.6 parts of stearyl alcohol (NAA-46), followed by heating of the mixture to 40° C. After the confirmation of thorough dissolution of stearyl alcohol, 50 parts of xylylene diisocyanate subjected to trimethylol-propane adduct modification ("TAKENATE D-110N" a trade name of Takeda Chemical Industries, Ltd., N.V.: 75, NCO %: 11.5) were charged and the mixture was heated to 70° C. After 30 minutes of the reaction at the same temperature, 0.02 parts of dibutyltin laurate were charged. After the mixture was maintained at the same temperature for 3 hours, 91.7 parts of polycaprolactone-modified hydroxyethyl acrylate (PLACCEL FA5), 0.02 parts of dibutyltin laurate, and 0.02 parts of hydroquinone monomethyl ether were charged. The mixture was maintained at 70° C. for 3 hours to complete the reaction, and 76.5 parts of toluene were added to obtain a urethane acrylate containing 50% by weight of solid.

Synthesis Example 8

Into a flask similar to the flask in Synthesis Example 1 were charged 60.4 parts of toluene and 7.6 parts of cetyl alcohol ("NAA-44", a trade name of NOF Corporation, hydroxyl value: 230), followed by heating of the mixture to 40° C. After the confirmation of thorough dissolution of cetyl alcohol, 50 parts of hexamethylene diisocyanate subjected to isocyanurate modification (TAKENATE D-170N) were charged and the mixture was heated to 70° C. After 30 minutes of the reaction at the same temperature, 0.02 parts of dibutyltin laurate were charged. After the mixture was maintained at the same temperature for 3 hours, 83.4 parts of polycaprolactone-modified hydroxyethyl acrylate (PLACCEL FA2D), 0.02 parts of dibutyltin laurate, and 0.02 parts of hydroquinone monomethyl ether were charged. The mixture was maintained at 70° C. for 3 hours to complete the reaction, and 80.6 parts of toluene were added to obtain a urethane acrylate containing 50% by weight of solid.

Synthesis Example 9

Into a flask similar to the flask in Synthesis Example 1 were charged 29.8 parts of toluene and 4.1 parts of cetyl alcohol (NAA-44), followed by heating of the mixture to 40° C. After the confirmation of thorough dissolution of cetyl alcohol, 50 parts of isophorone diisocyanate subjected to trimethylol-propane adduct modification ("TAKENATE D-140N" a trade name of Takeda Chemical Industries, Ltd., N.V.: 75, NCO %: 10.8) were charged and the mixture was heated to 70° C. After 30 minutes of the reaction at the same temperature, 0.02 parts of dibutyltin laurate were charged. After the mixture was maintained at the same temperature for 3 hours, 57.1 parts of polycaprolactone-modified hydroxyethyl acrylate (PLACCEL FA3), 0.02 parts of dibutyltin laurate, and 0.02 parts of hydroquinone monomethyl ether were charged. The mixture was maintained at 70° C. for 3 hours to complete the reaction, and 56.4 parts of toluene were added to obtain a urethane acrylate containing 50% by weight of solid.

Synthesis Example 10

Into a flask similar to the flask in Synthesis Example 1 were charged 61.3 parts of toluene and 9.7 parts of behenyl alcohol ("NAA-422", a trade name of NOF Corporation, hydroxyl value: 180), followed by heating of the mixture to 40° C. After the confirmation of thorough dissolution of behenyl alcohol, 50 parts of hexamethylene diisocyanate subjected to isocyanurate modification (TAKENATE D-170N) were charged and the mixture was heated to 70° C. After 30 minutes of the reaction at the same temperature, 0.02 parts of dibutyltin laurate were charged. After the mixture was maintained at the same temperature for 3 hours, 83.4 parts of polycaprolactone-modified hydroxyethyl acrylate (PLACCEL FA2D), 0.02 parts of dibutyltin laurate, and 0.02 parts of hydroquinone monomethyl ether were charged. The mixture was maintained at 70° C. for 3 hours to complete the reaction, and 81.8 parts of toluene were added to obtain a urethane acrylate containing 50% by weight of solid.

Synthesis Example 11

Into a flask similar to the flask in Synthesis Example 1 were charged 65 parts of toluene and 18 parts of a polyether-modified cetyl alcohol ("NONION P-208", a trade name of NOF Corporation, hydroxyl value: 95), followed by heating of the mixture to 40° C. After the confirmation of thorough dissolution of the polyether-modified cetyl alcohol, 50 parts of hexamethylene diisocyanate subjected to isocyanurate modification (TAKENATE D-170N) were charged and the mixture was heated to 70° C. After 30 minutes of the reaction at the same temperature, 0.02 parts of dibutyltin laurate were charged. After the mixture was maintained at the same temperature for 3 hours, 83.7 parts of polycaprolactone-modified hydroxyethyl acrylate (PLACCEL FA2D), 0.02 parts of dibutyltin laurate, and 0.02 parts of hydroquinone monomethyl ether were charged. The mixture was maintained at 70° C. for 3 hours to complete the reaction, and 86.7 parts of toluene were added to obtain a urethane acrylate containing 50% by weight of solid.

Synthesis Example 12

Into a flask similar to the flask in Synthesis Example 1 were charged 51.7 parts of toluene, 5.8 parts of lauryl alcohol ("NAA-42", a trade name of NOF Corporation, hydroxyl value: 301), and 50 parts of hexamethylene diisocyanate subjected to isocyanurate modification (TAKENATE D-170N), and the mixture was heated to 70° C. After 30 minutes of the reaction at the same temperature, 0.02 parts of dibutyltin laurate were charged. After the mixture was maintained at the same temperature for 3 hours, 83.4 parts of polycaprolactone-modified hydroxyethyl acrylate (PLACCEL FA2D), 0.02 parts of dibutyltin laurate, and 0.02 parts of hydroquinone monomethyl ether were charged. The mixture was maintained at 70° C. for 3 hours to complete the reaction, and 79.5 parts of toluene were added to obtain a urethane acrylate containing 50% by weight of solid.

Synthesis Example 13

Into a flask similar to the flask in Synthesis Example 1 were charged 50 parts of toluene, 50 parts of hexamethylene diisocyanate subjected to isocyanurate modification (TAKENATE D-170N), 94 parts of polycaprolactone-modified hydroxyethyl acrylate (PLACCEL FA2D), 0.02 parts of dibutyltin laurate, and 0.02 parts of hydroquinone monomethyl ether. The mixture was maintained at 70° C. for 5 hours to complete the reaction, and 94 parts of toluene were added to obtain a urethane acrylate containing 50% by weight of solid.

Synthesis Example 14

Into a flask similar to the flask in Synthesis Example 1 were charged 61.6 parts of toluene and 1.4 parts of stearyl alcohol (NAA-46), followed by heating of the mixture to 40° C. After the confirmation of thorough dissolution of stearyl alcohol, 50 parts of hexamethylene diisocyanate subjected to isocyanurate modification (TAKENATE D-170N) were charged and the mixture was heated to 70° C. After 30 minutes of the reaction at the same temperature, 0.02 parts of dibutyltin laurate were charged. After the mixture was maintained at the same temperature for 3 hours, 92.3 parts of polycaprolactone-modified hydroxyethyl acrylate (PLACCEL FA2D), 0.02 parts of dibutyltin laurate, and 0.02 parts of hydroquinone monomethyl ether were charged. The mixture was maintained at 70° C. for 3 hours to complete the reaction, and 82.1 parts of toluene were added to obtain a urethane acrylate containing 50% by weight of solid.

Synthesis Example 15

Into a flask similar to the flask in Synthesis Example 1 were charged 59.5 parts of toluene and 20 parts of stearyl alcohol (NAA-46), followed by heating of the mixture to 40° C. After the confirmation of thorough dissolution of stearyl alcohol, 50 parts of hexamethylene diisocyanate subjected to isocyanurate modification (TAKENATE D-170N) were charged and the mixture was heated to 70° C. After 30 minutes of the reaction at the same temperature, 0.02 parts of dibutyltin laurate were charged. After the mixture was maintained at the same temperature for 3 hours, 68.8 parts of polycaprolactone-modified hydroxyethyl acrylate (PLACCEL FA2D), 0.02 parts of dibutyltin laurate, and 0.02 parts of hydroquinone monomethyl ether were charged. The mixture was maintained at 70° C. for 3 hours to complete the reaction, and 79.3 parts of toluene were added to obtain a urethane acrylate containing 50% by weight of solid.

Synthesis Example 16

Into a flask similar to the flask in Synthesis Example 1 were charged 61.7 parts of toluene and 0.6 parts of stearyl alcohol (NAA-46), followed by heating of the mixture to 40° C. After the confirmation of thorough dissolution of stearyl alcohol, 50 parts of hexamethylene diisocyanate subjected to isocyanurate modification (TAKENATE D-170N) were charged and the mixture was heated to 70° C. After 30 minutes of the reaction at the same temperature, 0.02 parts of dibutyltin laurate were charged. After the mixture was maintained at the same temperature for 3 hours, 93.4 parts of polycaprolactone-modified hydroxyethyl acrylate (PLACCEL FA2D), 0.02 parts of dibutyltin laurate, and 0.02 parts of hydroquinone monomethyl ether were charged. The mixture was maintained at 70° C. for 3 hours to complete the reaction, and 82.3 parts of toluene were added to obtain a urethane acrylate containing 50% by weight of solid.

Synthesis Example 17

Into a flask similar to the flask in Synthesis Example 1 were charged 59 parts of toluene and 24 parts of stearyl alcohol (NAA-46), followed by heating of the mixture to 40° C. After the confirmation of thorough dissolution of stearyl alcohol, 50 parts of hexamethylene diisocyanate subjected to isocyanurate modification (TAKENATE D-170N) were charged and the mixture was heated to 70° C. After 30 minutes of the reaction at the same temperature, 0.02 parts of dibutyltin laurate were charged. After the mixture was maintained at the same temperature for 3 hours, 63.7 parts of polycaprolactone-modified hydroxyethyl acrylate (PLACCEL FA2D), 0.02 parts of dibutyltin laurate, and 0.02 parts of hydroquinone monomethyl ether were charged. The mixture was maintained at 70° C. for 3 hours to complete the reaction, and 78.7 parts of toluene were added to obtain a urethane acrylate containing 50% by weight of solid.

Synthesis Example 18

Into a flask similar to the flask in Synthesis Example 1 were charged 62.3 parts of toluene and 8.4 parts of stearyl alcohol (NAA-46), followed by heating of the mixture to 40 C. After the confirmation of thorough dissolution of stearyl alcohol, 50 parts of hexamethylene diisocyanate subjected to isocyanurate modification (TAKENATE D-170N) were charged and the mixture was heated to 70 C. After 30 minutes of the reaction at the same temperature, 0.02 parts of dibutyltin laurate were charged. After the mixture was maintained at the same temperature for 3 hours, 86.9 parts of polycaprolactone-modified hydroxyethyl (meth)acrylate ("PLACCEL FM2D", a trade name of Daicel Chemical Industries, Ltd., hydroxyl value: 157), 0.02 parts of dibutyltin laurate, and 0.02 parts of hydroquinone monomethyl ether were charged. The mixture was maintained at 70 C. for 3 hours to complete the reaction, and 83 parts of toluene were added to obtain a urethane methacrylate containing 50% by weight of solid.

Synthesis Example 19

Into a flask similar to the flask in Synthesis Example 1 were charged 60.7 parts of toluene and 4.2 parts of myristyl alcohol (manufactured by Tokyo Kasei Kogyo Co., Ltd., super-high grade reagent, melting point 40° C.), followed by heating of the mixture to 40° C. After the confirmation of thorough dissolution of myristyl alcohol, 50 parts of hexamethylene diisocyanate subjected to isocyanurate modification (TAKENATE D-170N) were charged and the mixture was heated to 70° C. After 30 minutes of the reaction at the same temperature, 0.02 parts of dibutyltin laurate were charged. After the mixture was maintained at the same temperature for 3 hours, 87.4 parts of polycaprolactone-modified hydroxyethyl acrylate (PLACCEL FA2D), 0.02 parts of dibutyltin laurate, and 0.02 parts of hydroquinone monomethyl ether were charged. The mixture was maintained at 70° C. for 3 hours to complete the reaction, and 80.9 parts of toluene were added to obtain a urethane acrylate containing 50% by weight of solid.

Synthesis Example 20

Into a flask similar to the flask in Synthesis Example 1 were charged 59.6 parts of toluene and 4.2 parts of tridecanol (manufactured by Tokyo Kasei Kogyo Co., Ltd., super-high grade reagent), followed by heating of the mixture to 40° C. After the confirmation of thorough dissolution of tridecanol, 50 parts of hexamethylene diisocyanate subjected to isocyanurate modification (TAKENATE D-170N) were charged and the mixture was heated to 70° C. After 30 minutes of the reaction at the same temperature, 0.02 parts of dibutyltin laurate were charged. After the mixture was maintained at the same temperature for 3 hours, 87.4 parts of polycaprolactone-modified hydroxyethyl acrylate (PLACCEL FA2D), 0.02 parts of dibutyltin laurate, and 0.02 parts of hydroquinone monomethyl ether were charged. The mixture was maintained at 70° C. for 3 hours to complete the reaction, and 80.9 parts of toluene were added to obtain a urethane acrylate containing 50% by weight of solid.

Synthesis Example 21

Into a flask similar to the flask in Synthesis Example 1 were charged 62.0 parts of toluene and 6.0 parts of a polyoxyethylene monostearate ("NONION S-2", a trade name of NOF Corporation), followed by stirring of the mixture. After the confirmation of thorough dissolution of the polyoxyethylene monostearate, 50 parts of hexamethylene diisocyanate subjected to isocyanurate modification (TAKENATE D-170N) were charged and the mixture was heated to 70° C. After 30 minutes of the reaction at the same temperature, 0.02 parts of dibutyltin laurate were charged. After the mixture was maintained at the same temperature for 3 hours, 88.6 parts of polycaprolactone-modified hydroxyethyl acrylate (PLACCEL FA2D), 0.02 parts of dibutyltin laurate, and 0.02 parts of hydroquinone monomethyl ether were charged. The mixture was maintained at 70° C. for 3 hours to complete the reaction, and 82.6 parts of toluene were added to obtain a urethane acrylate containing 50% by weight of solid.

Synthesis Example 22

Into a flask similar to the flask in Synthesis Example 1 were charged 62.6 parts of toluene and 7.3 parts of a polyoxyethylene cetyl ether ("NONION P-205", a trade name of NOF Corporation), followed by heating of the mixture to 40° C. After the confirmation of thorough dissolution of the polyoxyethylene cetyl ether, 50 parts of hexamethylene diisocyanate subjected to isocyanurate modification (TAKENATE D-170N) were charged and the mixture was heated to 70° C. After 30 minutes of the reaction at the same temperature, 0.02 parts of dibutyltin laurate were charged. After the mixture was maintained at the same temperature for 3 hours, 88.8 parts of polycaprolactone-modified hydroxyethyl acrylate (PLACCEL FA2D), 0.02 parts of dibutyltin laurate, and 0.02 parts of hydroquinone monomethyl ether were charged. The mixture was maintained at 70° C. for 3 hours to complete the reaction, and 83.5 parts of toluene were added to obtain a urethane acrylate containing 50% by weight of solid.

Table 1 shows part of the synthesis conditions in Synthesis Examples 1 to 22.

TABLE 1

| Synthesis Example | (B) Organic isocyanate (modified type) | (D) Polycaprolactone-modified hydroxyethyl (meth)acrylate | (C) Long-chain alkyl alcohol | (B):(D):(C)* |
|---|---|---|---|---|
| 1 | HDI (—) | FA2D | Stearyl alcohol | 1:0.98:0.12 |
| 2 | HDI (Isocyanurate) | FA2D | Stearyl alcohol | 1:0.98:0.12 |
| 3 | HDI (Isocyanurate) | FA5 | Stearyl alcohol | 1:0.97:0.12 |
| 4 | HDI (Isocyanurate) | HEA | Stearyl alcohol | 1:0.98:0.12 |
| 5 | HDI (Biuret) | FA4 | Stearyl alcohol | 1:0.98:0.12 |
| 6 | HDI (TMP adduct) | FA3 | Stearyl alcohol | 1:0.98:0.12 |
| 7 | XDI (TMP adduct) | FA5 | Stearyl alcohol | 1:0.98:0.12 |
| 8 | HDI (Isocyanurate) | FA2D | Cetyl alcohol | 1:0.97:0.13 |
| 9 | IPDI (TMP adduct) | FA3 | Cetyl alcohol | 1:0.97:0.13 |
| 10 | HDI (Isocyanurate) | FA2D | Behenyl alcohol | 1:0.97:0.13 |
| 11 | HDI (Isocyanurate) | FA2D | Polyether-modified cetyl alcohol | 1:0.98:0.12 |
| 12 | HDI (Isocyanurate) | FA2D | Lauryl alcohol | 1:0.97:0.13 |
| 13 | HDI (Isocyanurate) | FA2D | None | 1:1.1:0 |
| 14 | HDI (Isocyanurate) | FA2D | Stearyl alcohol | 1:1.08:0.02 |
| 15 | HDI (Isocyanurate) | FA2D | Stearyl alcohol | 1:0.8:0.3 |
| 16 | HDI (isocyanurate) | FA2D | Stearyl alcohol | 1:1.09:0.01 |
| 17 | HDI (Isocyanurate) | FA2D | Stearyl alcohol | 1:0.74:0.36 |
| 18 | HDI (Isocyanurate) | FM2D | Stearyl alcohol | 1:0.98:0.12 |
| 19 | HDI (Isocyanurate) | FA2D | Myristyl alcohol | 1:1.02:0.08 |
| 20 | HDI (Isocyanurate) | FA2D | Tridecanol | 1:1.02:0.08 |
| 21 | HDI (Isocyanurate) | FA2D | Polyoxyethylene monostearate | 1:1.04:0.06 |
| 22 | HDI (Isocyanurate) | FA2D | Polyoxyethylene cetyl ether | 1:1.04:0.06 |

*isocyanate group of (B):hydroxyl group of (D):hydroxyl group of (C) [molar ratio]

Example 1

By blending 20 parts of phthalic acid monohydroxyethyl acrylate ("M-5400", a trade name of Toagosei Co., Ltd.), 20 parts of toluene, and 3 parts of a photo-initiator ("IRGACURE 184", a trade name of Ciba-Geigy Corp.) in 100 parts of the urethane acrylate obtained in Synthesis Example 1, a curable composition having 50% by weight of solid was obtained.

Example 2

By blending 3.5 parts of an antistatic agent ("CATION B-4", a trade name of NOF Corporation) in 100 parts of the curable composition obtained in Example 1, a curable composition having 50% by weight of solid was obtained.

Example 3

By blending 3 parts of a photo-initiator (IRGACURE 184) in 100 parts of the urethane acrylate obtained in Synthesis Example 2, a curable composition having 50% by weight of solid was obtained.

Example 4

By blending 4 parts of an antistatic agent (CATION B-4) and 2 parts of a photo-initiator (IRGACURE 184) in 100 parts of the urethane acrylate obtained in Synthesis Example 2, a curable composition having 50% by weight of solid was obtained.

Example 5

20 parts of phthalic acid monohydroxyethyl acrylate (M-5400), 0.02 parts of PMMA beads ("GM-0630H", a trade name of Ganz Chemical Co., Ltd.), 20 parts of toluene, and 0.8 parts of a photo-initiator (IRGACURE 184) were blended in 100 parts of the curable composition obtained in Example 4, and the mixture was sufficiently dispersed by means of a dispersion mixing machine, whereby a curable composition having 50% by weight of solid was obtained.

Example 6

35 parts of PMMA beads (GM-0630H), 35 parts of toluene, and 2 parts of a photo-initiator (IRGACURE 184)

were blended in 100 parts of the urethane acrylate obtained in Synthesis Example 3, and the mixture was sufficiently dispersed by means of a dispersion mixing machine, whereby a curable composition having 50% by weight of solid was obtained.

Example 7

By blending 2.5 parts of an antistatic agent (CATION B-4) in 100 parts of the curable composition obtained in Example 6, a curable composition having 50% by weight of solid was obtained.

Example 8

By blending 40 parts of phthalic acid monohydroxyethyl acrylate (M-5400), 6 parts of dipentaerythritol hexaacrylate ("M-400", a trade name of Toagosei Chemical Industries, Co., Ltd.), 46 parts of toluene, and 3.8 parts of a photo-initiator (IRGACURE 184) in 100 parts of the urethane acrylate obtained in Synthesis Example 5, a curable composition having 50% by weight of solid was obtained.

Example 9

35 parts of nylon beads ("SP-500", a trade name of Toray Industries, Inc.) and 35 parts of toluene were blended in 100 parts of the curable composition obtained in Example 8, and the mixture was sufficiently dispersed by means of a dispersion mixing machine, whereby a curable composition having 50% by weight of solid was obtained.

Example 10

By blending 2.5 parts of an antistatic agent (CATION B-4) and 2 parts of a photo-initiator (IRGACURE 184) in 100 parts of the urethane acrylate obtained in Synthesis Example 6, a curable composition having 50% by weight of solid was obtained.

Example 11

By blending 20 parts of phthalic acid monohydroxyethyl acrylate (M-5400), 20 parts of toluene, and 0.8 parts of a photo-initiator (IRGACURE 184) in 100 parts of the curable composition obtained in Example 10, a curable composition having 50% by weight of solid was obtained.

Example 12

By blending 2 parts of a photo-initiator (IRGACURE 184) in 100 parts of the urethane acrylate obtained in Synthesis Example 7, a curable composition having 50% by weight of solid was obtained.

Example 13

By blending 20 parts of phthalic acid monohydroxyethyl acrylate (M-5400), 20 parts of toluene, and 0.8 parts of a photo-initiator (IRGACURE 184) in 100 parts of the curable composition obtained in Example 12, a curable composition having 50% by weight of solid was obtained.

Example 14

By blending 0.02 parts of PNMA beads (GM-0630H) and 2.5 parts of an antistatic agent (CATION B-4) in 100 parts of the curable composition obtained in Example 13, a curable composition having 50% by weight of solid was obtained.

Example 15

35 parts of PMMA beads (GM-0630H), 35 parts of toluene, and 2 parts of a photo-initiator (IRGACURE 184) were blended in 100 parts of the urethane acrylate obtained in Synthesis Example 8, and the mixture was sufficiently dispersed by means of a dispersion mixing machine, whereby a curable composition having 50% by weight of solid was obtained.

Example 16

By blending 12 parts of phthalic acid monohydroxyethyl acrylate (M-5400), 12 parts of toluene, and 0.5 parts of a photo-initiator (IRGACURE 184) in 100 parts of the curable composition obtained in Example 15, a curable composition having 50% by weight of solid was obtained.

Example 17

By blending 2.5 parts of an antistatic agent (CATION B-4) and 2 parts of a photo-initiator (IRGACURE 184) in 100 parts of the urethane acrylate obtained in Synthesis Example 9, a curable composition having 50% by weight of solid was obtained.

Example 18

By blending 20 parts of phthalic acid monohydroxyethyl acrylate (M-5400), 20 parts of toluene, and 0.8 parts of a photo-initiator (IRGACURE 184) in 100 parts of the curable composition obtained in Example 17, a curable composition having 50% by weight of solid was obtained.

Example 19

By blending 0.02 parts of PMMA beads (GM-0630H) and 2 parts of a photo-initiator (IRGACURE 184) in 100 parts of the urethane acrylate obtained in Synthesis Example 10, a curable composition having 50% by weight of solid was obtained.

Example 20

By blending 2.5 parts of an antistatic agent (CATION B-4) in 100 parts of the curable composition obtained in Example 19, a curable composition having 50% by weight of solid was obtained.

Example 21

By blending 2 parts of a photo-initiator (IRGACURE 184) in 100 parts of the urethane acrylate obtained in Synthesis Example 11, a curable composition having 50% by weight of solid was obtained.

Example 22

0.02 parts of nylon beads (SP-500) and 2 parts of a photo-initiator (IRGACURE 184) were blended in 100 parts of the urethane acrylate obtained in Synthesis Example 11, and the mixture was sufficiently dispersed by means of a dispersion mixing machine, whereby a curable composition having 50% by weight of solid was obtained.

Example 23

By blending 20 parts of phthalic acid monohydroxyethyl acrylate (M-5400), 3 parts of dipentaerythritol hexaacrylate (M-400), 3.7 parts of an antistatic agent (CATION B-4), 23 parts of toluene, and 0.9 parts of a photo-initiator (IRGACURE 184) in 100 parts of the curable composition obtained in Example 22, a curable composition having 50% by weight of solid was obtained.

Example 24

By blending 2 parts of a photo-initiator (IRGACURE 184) in 100 parts of the urethane acrylate obtained in Synthesis Example 14, a curable composition having 50% by weight of solid was obtained.

Example 25

0.02 parts of PMMA beads (GM-0630H) were blended in 100 parts of the curable composition obtained in Example 24, and the mixture was sufficiently dispersed by means of a dispersion mixing machine, whereby a curable composition having 50% by weight of solid was obtained.

Example 26

By blending 2.5 parts of an antistatic agent (CATION B-4) in 100 parts of the curable composition obtained in Example 25, a curable composition having 50% by weight of solid was obtained.

Example 27

By blending 20 parts of phthalic acid monohydroxyethyl acrylate (M-5400), 3 parts of dipentaerythritol hexaacrylate (M-400), 23 parts of toluene, and 2.9 parts of a photo-initiator (IRGACURE 184) in 100 parts of the urethane acrylate obtained in Synthesis Example 15, a curable composition having 50% by weight of solid was obtained.

Example 28

0.02 parts of PMMA beads (GM-0630H) were blended in 100 parts of the curable composition obtained in Example 27, and the mixture was sufficiently dispersed by means of a dispersion mixing machine, whereby a curable composition having 50% by weight of solid was obtained.

Example 29

The urethane acrylate obtained in Synthesis Example 18 was employed as it was, as a curable composition.

Example 30

20 parts of phthalic acid monohydroxyethyl acrylate (M-5400), 0.02 parts of PMMA beads (GM-0630H), and 3.5 parts of an antistatic agent (CATION B-4) were blended in 100 parts of the curable composition obtained in Example 29, and the mixture was sufficiently dispersed by means of a dispersion mixing machine, whereby a curable composition was obtained.

Example 31

By blending 20 parts of phthalic acid monohydroxyethyl acrylate (M-5400), 3 parts of dipentaerythritol hexaacrylate (M-400), 23 parts of toluene, and 3 parts of a photo-initiator (IRGACURE 184) in 100 parts of the urethane acrylate obtained in Synthesis Example 19, a curable composition having 50% by weight of solid was obtained.

Example 32

By blending 20 parts of phthalic acid monohydroxyethyl acrylate (M-5400), 3 parts of dipentaerythritol hexaacrylate (M-400), 23 parts of toluene, and 3 parts of a photo-initiator (IRGACURE 184) in 100 parts of the urethane acrylate obtained in Synthesis Example 20, a curable composition having 50% by weight of solid was obtained.

Example 33

By blending 5 parts of dipentaerythritol hexaacrylate (M-400), 8 parts of an active energy ray-reactive antistatic agent ("NK oligo U-601LPA60", a trade name of Shin-Nakamura Chemicals Co., Ltd.), 13 parts of toluene, and 2 parts of a photo-initiator (IRGACURE 184) in 100 parts of the urethane acrylate obtained in Synthesis Example 21, a curable composition having 50% by weight of solid was obtained.

Example 34

By blending 5 parts of dipentaerythritol hexaacrylate (M-400), 3 parts of an antistatic agent ("SANKONOL PRO-10R", a trade name of Sanko Kagaku Kogyo Co., Ltd.), 8 parts of toluene, and 2 parts of a photo-initiator (IRGACURE 184) in 100 parts of the urethane acrylate obtained in Synthesis Example 21, a curable composition having 50% by weight of solid was obtained.

Example 35

By blending 5 parts of dipentaerythritol hexaacrylate (M-400), 8 parts of an active energy ray-reactive antistatic agent (NK oligo U-601LPA60), 13 parts of toluene, and 2 parts of a photo-initiator (IRGACURE 184) in 100 parts of the urethane acrylate obtained in Synthesis Example 22, a curable composition having 50% by weight of solid was obtained.

Comparative Example 1

By blending 2 parts of a photo-initiator (IRGACURE 184) in 100 parts of the urethane acrylate obtained in Synthesis Example 4, a curable composition having 50% by weight of solid was obtained.

Comparative Example 2

20 parts of phthalic acid monohydroxyethyl acrylate (M-5400), 0.02 parts of PMMA beads (GM-0630H), 20 parts of toluene, 3.5 parts of an antistatic agent (CATION B-4), and 0.8 parts of a photo-initiator (IRGACURE 184) were blended in 100 parts of the curable composition obtained in Comparative Example 1, and the mixture was sufficiently dispersed by means of a dispersion mixing machine, whereby a curable composition having 50% by weight of solid was obtained.

Comparative Example 3

By blending 20 parts of phthalic acid monohydroxyethyl acrylate (M-5400), 20 parts of toluene, and 2.8 parts of a photo-initiator (IRGACURE 184) in 100 parts of the urethane acrylate obtained in Synthesis Example 12, a curable composition having 50% by weight of solid was obtained.

Comparative Example 4

0.02 parts of PMMA beads (GM-0630H) and 2.5 parts of an antistatic agent (CATION B-4) were blended in 100 parts of the curable composition obtained in Comparative Example 3, and the mixture was sufficiently dispersed by means of a dispersion mixing machine, whereby a curable composition having 50% by weight of solid was obtained.

Comparative Example 5

35 parts of nylon beads (SP-500), 35 parts of toluene, and 2 parts of a photo-initiator (IRGACURE 184) were blended in 100 parts of the urethane acrylate obtained in Synthesis Example 13, and the mixture was sufficiently dispersed by means of a dispersion mixing machine, whereby a curable composition having 50% by weight of solid was obtained.

Comparative Example 6

By blending 20 parts of phthalic acid monohydroxyethyl acrylate (M-5400), 3 parts of dipentaerythritol hexaacrylate (M-400), 3.7 parts of an antistatic agent (CATION B-4), 23 parts of toluene, and 2.9 parts of a photo-initiator (IRGACURE 184) in 100 parts of the curable composition obtained in Comparative Example 5, a curable composition having 50% by weight of solid was obtained.

Comparative Example 7

By blending 20 parts of phthalic acid monohydroxyethyl acrylate (M-5400), 3.5 parts of an antistatic agent (CATION B-4), 20 parts of toluene, and 2.8 parts of a photo-initiator (IRGACURE 184) in 100 parts of the urethane acrylate obtained in Synthesis Example 16, a curable composition having 50% by weight of solid was obtained.

Comparative Example 8

0.02 parts of PMMA beads (GM-0630H) were blended in 100 parts of the curable composition obtained in Comparative Example 7, and the mixture was sufficiently dispersed by means of a dispersion mixing machine, whereby a curable composition having 50% by weight of solid was obtained.

Comparative Example 9

By blending 2.5 parts of an antistatic agent (CATION B-4) and 2 parts of a photo-initiator (IRGACURE 184) in 100 parts of the urethane acrylate obtained in Synthesis Example 17, a curable composition having 50% by weight of solid was obtained.

Comparative Example 10

By blending 20 parts of phthalic acid monohydroxyethyl acrylate (M-5400), 0.02 parts of PMMA beads (GM-0630H), 20 parts of toluene, and 0.8 parts of a photo-initiator (IRGACURE 184) in 100 parts of the curable composition obtained in Comparative Example 9, a curable composition having 50% by weight of solid was obtained.

Comparative Example 11

80 parts of dipentaerythritol hexaacrylate (M-400), 20 parts of tetrahydrofurfuryl acrylate ("LIGHT-ACRYLATE THF-A", a trade name of Kyoeisha Chemical Co., Ltd.), 100 parts of toluene, and 4 parts of a photo-initiator (IRGACURE 184) were blended, whereby a curable composition (a hard-coating agent) having 50% by weight of solid was obtained.

Comparative Example 12

100 parts of an acrylic polyol ("GAMERON 18–300", a trade name of Natoco Co., Ltd.) and 20 parts of an isocyanate curing agent ("GAMERON curing agent 18–001", a trade name of Natoco Co., Ltd.) were blended, whereby a two-pack type acrylurethane soft paint was obtained.

The following Tables 2 and 3 show part of the components to be mixed in the above Examples and Comparative Examples.

TABLE 2

| Example | (A) Active energy ray-curable urethane (meth)acrylate | (E) Compound having active energy ray-curable functional group copolymerizable with (A) | (F) Beads | (G) Antistatic agent | (H) Photo-initiator |
|---|---|---|---|---|---|
| 1 | Synthesis Exp. 1 | ○ | — | — | ○ |
| 2 | Synthesis Exp. 1 | ○ | — | ○ | ○ |
| 3 | Synthesis Exp. 2 | — | — | — | ○ |
| 4 | Synthesis Exp. 2 | — | — | ○ | ○ |
| 5 | Synthesis Exp. 2 | ○ | ○ | ○ | ○ |
| 6 | Synthesis Exp. 3 | — | ○ | — | ○ |
| 7 | Synthesis Exp. 3 | — | ○ | ○ | ○ |
| 8 | Synthesis Exp. 5 | ○ | — | — | ○ |
| 9 | Synthesis Exp. 5 | ○ | ○ | — | ○ |
| 10 | Synthesis Exp. 6 | — | — | ○ | ○ |
| 11 | Synthesis Exp. 6 | ○ | — | ○ | ○ |
| 12 | Synthesis Exp. 7 | — | — | — | ○ |
| 13 | Synthesis Exp. 7 | ○ | — | — | ○ |
| 14 | Synthesis Exp. 7 | ○ | ○ | ○ | ○ |
| 15 | Synthesis Exp. 8 | — | ○ | — | ○ |
| 16 | Synthesis Exp. 8 | ○ | ○ | — | ○ |
| 17 | Synthesis Exp. 9 | — | — | ○ | ○ |
| 18 | Synthesis Exp. 9 | ○ | — | ○ | ○ |
| 19 | Synthesis Exp. 10 | — | ○ | — | ○ |
| 20 | Synthesis Exp. 10 | — | ○ | ○ | ○ |
| 21 | Synthesis Exp. 11 | — | — | — | ○ |
| 22 | Synthesis Exp. 11 | — | ○ | — | ○ |
| 23 | Synthesis Exp. 11 | ○ | ○ | ○ | ○ |
| 24 | Synthesis Exp. 14 | — | — | — | ○ |
| 25 | Synthesis Exp. 14 | — | ○ | — | ○ |
| 26 | Synthesis Exp. 14 | — | ○ | ○ | ○ |
| 27 | Synthesis Exp. 15 | ○ | — | — | ○ |
| 28 | Synthesis Exp. 15 | ○ | ○ | — | ○ |
| 29 | Synthesis Exp. 18 | — | — | — | — |
| 30 | Synthesis Exp. 18 | ○ | ○ | ○ | — |
| 31 | Synthesis Exp. 19 | ○ | — | — | ○ |

TABLE 2-continued

| Example | (A) Active energy ray-curable urethane (meth)acrylate | (E) Compound having active energy ray-curable functional group copolymerizable with (A) | (F) Beads | (G) Antistatic agent | (H) Photo-initiator |
|---|---|---|---|---|---|
| 32 | Synthesis Exp. 20 | ○ | — | — | ○ |
| 33 | Synthesis Exp. 21 | ○ | — | ○ | ○ |
| 34 | Synthesis Exp. 21 | ○ | — | ○ | ○ |
| 35 | Synthesis Exp. 22 | ○ | — | ○ | ○ |

TABLE 3

| Comparative ExampleNo. | (A) Active energy ray-curable urethane (meth)acrylate | (E) Compound having active energy ray-curable functional group copolymerizable with (A) | (F) Beads | (G) Antistatic agent | (H) Photo-initiator |
|---|---|---|---|---|---|
| 1 | Synthesis Example 4 | — | — | — | ○ |
| 2 | Synthesis Example 4 | ○ | ○ | ○ | ○ |
| 3 | Synthesis Example 12 | ○ | — | — | ○ |
| 4 | Synthesis Example 12 | ○ | ○ | ○ | ○ |
| 5 | Synthesis Example 13 | — | ○ | — | ○ |
| 6 | Synthesis Example 13 | ○ | ○ | ○ | ○ |
| 7 | Synthesis Example 16 | ○ | — | ○ | ○ |
| 8 | Synthesis Example 16 | ○ | ○ | ○ | ○ |
| 9 | Synthesis Example 17 | — | — | ○ | ○ |
| 10 | Synthesis Example 17 | ○ | ○ | ○ | ○ |
| 11 | Common hard coating agent | | | | |
| 12 | Common two-pack type acrylurethane soft paint | | | | |

(Preparation of Test Plate)

Each of the compositions of Examples 1 to 35 and Comparative Examples 1 to 12 was applied onto an easily adhering PET plate, a polycarbonate plate, and an aluminum plate, and dried, and cured to prepare a test plate. It should be noted that in the case of an easily adhering PET plate, the composition was applied by a bar coater so that the film thickness became from 5 to 7 μm at drying. In the case of a polycarbonate or aluminum plate, the composition was applied by spraying so that the film thickness became from 10 to 15 μm at drying. The test plates other than the plate of Comparative Example 12 were subjected to drying treatment in a drying oven of 60° C. over the period of 1 minute. The test plate of Comparative Example 12 was subjected to drying treatment at 120° C. over the period of 15 minutes. The compositions other than those of Examples 29 and 30 were cured by conveying the test plates at a conveyer speed of 5 m/minute in a UV drying oven having the output of 80 W/cm of one light. In the case of those of Examples 29 and 30, the compositions were cured by irradiating the test plates with an electron beam at an accelerating voltage of 150 keV and an irradiation dose of 3 Mrad.

(Test Example)

Transparency of each paint, i.e., composition, transparency, adhesiveness, moisture resistance, solvent resistance, self-repairing function, blocking property, lubricity, flexure resistance, acid resistance, and alkali resistance of the coated film of each test plate, and damaging property to the prism sheet were evaluated at 5 ranks, and also abrasion resistance (haze value) and surface resistance value were measured.

Using the test plates made of a polycarbonate plate or aluminum plate, self-repairing function and flexure resistance were evaluated. The other evaluations and measurements were carried out using the test plates made of an easily adhering PET plate.

The paint transparency and coated film transparency were visually evaluated. The adhesiveness was evaluated according to a cross-cut cellophane-tape peeling test of JIS K5400. The moisture resistance was evaluated on the test plate after allowing it to stand at 50° C. and a relative humidity of 98% for 500 hours. The solvent resistance was evaluated by rubbing the plate a hundred times with toluene. The abrasion resistance was judged by the haze value (%) after 50 times of the rubbing with a 500 g load using #000 steel wool. The self-repairing function was evaluated by scratching the coated film with a nail, allowing the plate to stand at room temperature for 30 minutes, and then the degree of restoration of the scratch was visually evaluated. The blocking property was evaluated on the test plate to which a load of 200 g/cm$^2$ was exerted at 60° C. over the period of 24 hours using a constant-load compressing machine. The lubricity was evaluated by touching the plate with a finger. The flexure resistance was evaluated by folding the test plate to 0T. The acid resistance was evaluated by a 24-hour spot test using 0.1 N sulfuric acid. The alkali resistance was evaluated by a 24-hour spot test using 0.1 N sodium hydroxide. The damaging property to the prism sheet was evaluated by testing the plate ten times with a 200 g load using a friction-fastness testing machine. The surface resistance value was measured by means of a high resistance meter manufactured by Advantest Corporation. The results of these evaluations and measurements are shown in the following Tables 4 to 7. The symbols in the following tables mean as follows. ⊚: extremely good, ○: good, □: almost good, Δ: poor, X particularly poor

TABLE 4

| | Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Paint transparency | ○ | ○ | ○ | ○ | — | — | — | ○ | — | ○ | ○ | ○ |
| Coated film transparency | ○ | ○ | ○ | ○ | — | — | — | ○ | — | ○ | ○ | ○ |
| Adhesiveness | ⊚ | ⊚ | ○ | ○ | ⊚ | ○ | ○ | ⊚ | ⊚ | ○ | ⊚ | ○ |
| Moisture resistance | ○ | ○ | ○ | ○ | ○ | ○ | ○ | ○ | ○ | ○ | ○ | ○ |
| Solvent resistance | □ | □ | ○ | ○ | ○ | ○ | ○ | ⊚ | ⊚ | ○ | ○ | ○ |
| Abrasion resistance | 2> | 2> | 2> | 2> | 2> | 2> | 2> | 2> | 2> | 2> | 2> | 2> |
| Self-repairing function | □ | □ | ○ | ○ | ○ | ○ | ○ | ⊚ | ⊚ | ○ | ○ | ○ |
| Blocking property | ○ | ○ | ○ | ○ | ○ | ○ | ○ | ⊚ | ⊚ | ○ | ○ | ○ |
| Lubricity | □ | □ | ○ | ○ | ○ | ○ | ○ | ○ | ○ | ○ | ○ | ○ |
| Flexure resistance | ○ | ○ | ○ | ○ | ○ | ○ | ○ | ○ | ○ | ○ | ○ | ○ |
| Acid resistance | ○ | ○ | ○ | ○ | ○ | ○ | ○ | ○ | ○ | ○ | ○ | ○ |
| Alkali resistance | ○ | ○ | ○ | ○ | ○ | ○ | ○ | ○ | ○ | ○ | ○ | ○ |
| Damaging property to prism | ○ | ○ | ○ | ○ | ○ | ○ | ○ | ○ | ○ | ○ | ○ | ○ |
| Surface resistance value (Ω) | $10^{15}<$ | $10^{11}$ | $10^{15}<$ | $10^{11}$ | $10^{11}$ | $10^{15}<$ | $10^{11}$ | $10^{15}<$ | $10^{15}<$ | $10^{11}$ | $10^{11}$ | $10^{15}<$ |

TABLE 5

| | Example | | | | | | | | | | | |
|---|---|---|---|---|---|---|---|---|---|---|---|---|
| | 13 | 14 | 15 | 16 | 17 | 18 | 19 | 20 | 21 | 22 | 23 | 24 |
| Paint transparency | ○ | — | — | — | ○ | ○ | — | — | ○ | — | — | ○ |
| Coated film transparency | ○ | — | — | — | ○ | ○ | — | — | ○ | — | — | ○ |
| Adhesiveness | ⊚ | ⊚ | ○ | ⊚ | ○ | ⊚ | ○ | ○ | ○ | ○ | ⊚ | ○ |
| Moisture resistance | ○ | ○ | ○ | ○ | ○ | ○ | ○ | ○ | ○ | ○ | ○ | ○ |
| Solvent resistance | ○ | ○ | ○ | ○ | ○ | ○ | ○ | ○ | ○ | ○ | ⊚ | ○ |
| Abrasion resistance | 2> | 2> | 2> | 2> | 2> | 2> | 2> | 2> | 2> | 2> | 2> | 2> |
| Self-repairing function | ○ | ○ | ○ | ○ | ○ | ○ | ○ | ○ | ○ | ○ | ○ | ○ |
| Blocking property | ○ | ○ | ○ | ○ | ○ | ○ | ○ | ○ | ○ | ○ | ○ | ○ |
| Lubricity | ○ | ○ | ○ | ○ | ○ | ○ | ○ | ○ | ○ | ○ | ○ | □ |
| Flexure resistance | ○ | ○ | ○ | ○ | ○ | ○ | ○ | ○ | ○ | ○ | ○ | ○ |
| Acid resistance | ○ | ○ | ○ | ○ | ○ | ○ | ○ | ○ | ○ | ○ | ○ | ○ |
| Alkali resistance | ○ | ○ | ○ | ○ | ○ | ○ | ○ | ○ | ○ | ○ | ○ | ○ |
| Damaging property to prism | ○ | ○ | ○ | ○ | ○ | ○ | ○ | ○ | ○ | ○ | ○ | ○ |
| Surface resistance value (Ω) | $10^{15}<$ | $10^{11}$ | $10^{15}<$ | $10^{15}<$ | $10^{11}$ | $10^{11}$ | $10^{15}<$ | $10^{11}$ | $10^{13}$ | $10^{13}$ | $10^{9}$ | $10^{15}<$ |

TABLE 6

| | Example | | | | | | | | | | |
|---|---|---|---|---|---|---|---|---|---|---|---|
| | 25 | 26 | 27 | 28 | 29 | 30 | 31 | 32 | 33 | 34 | 35 |
| Paint transparency | — | — | ○ | — | ○ | — | ○ | ○ | ○ | ○ | ○ |
| Coated film transparency | — | — | ○ | — | ○ | — | ○ | ○ | ○ | ○ | ○ |
| Adhesiveness | ○ | ○ | ⊚ | ⊚ | ○ | ⊚ | ○ | ○ | ○ | ○ | ○ |
| Moisture resistance | ○ | ○ | ○ | ○ | ○ | ○ | ○ | ○ | ○ | ○ | ○ |
| Solvent resistance | ○ | ○ | ○ | ○ | ○ | ○ | ○ | ○ | ○ | ○ | ○ |
| Abrasion resistance | 2> | 2> | 2> | 2> | 2> | 2> | 2> | 2> | 2> | 2> | 2> |
| Self-repairing function | ○ | ○ | ○ | ○ | ○ | ○ | ○ | ○ | ○ | ○ | ○ |
| Blocking property | ○ | ○ | ⊚ | ⊚ | ○ | ○ | ○ | ○ | ○ | ○ | ○ |
| Lubricity | □ | □ | ⊚ | ⊚ | ○ | ○ | □ | □ | ○ | ○ | ○ |
| Flexure resistance | ○ | ○ | ○ | ○ | ○ | ○ | ○ | ○ | ○ | ○ | ○ |
| Acid resistance | ○ | ○ | ○ | ○ | ○ | ○ | ○ | ○ | ○ | ○ | ○ |
| Alkali resistance | ○ | ○ | ○ | ○ | ○ | ○ | ○ | ○ | ○ | ○ | ○ |
| Damaging property to prism | ○ | ○ | ○ | ○ | ○ | ○ | ○ | ○ | ○ | ○ | ○ |
| Surface resistance value (Ω) | $10^{15}<$ | $10^{11}$ | $10^{15}<$ | $10^{15}<$ | $10^{15}<$ | $10^{11}$ | $10^{15}<$ | $10^{15}<$ | $10^{10}$ | $10^{9}$ | $10^{9}$ |

TABLE 7

| | Comparative Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Paint transparency | ○ | — | ○ | — | — | — | ○ | — | △ | △ | ○ | ○ |
| Coated film transparency | ○ | — | ○ | — | — | — | ○ | — | △ | △ | ○ | ○ |
| Adhesiveness | ○ | ○ | ○ | ⊚ | ○ | ⊚ | ○ | ○ | ○ | ⊚ | □ | ○ |
| Moisture resistance | ○ | ○ | ○ | ○ | ○ | ○ | ○ | ○ | ○ | ○ | ○ | ○ |
| Solvent resistance | ○ | ○ | ○ | ○ | ○ | ○ | ○ | ○ | ○ | ○ | ○ | ○ |

TABLE 7-continued

| | Comparative Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Abrasion resistance | 8> | 8> | 2> | 2> | 2> | 2> | 2> | 2> | 2> | 2> | 2> | 8> |
| Self-repairing function | x | x | ○ | ○ | ○ | ○ | ○ | ○ | ○ | ○ | x | x |
| Blocking property | ○ | ○ | x | x | Δ | Δ | Δ | Δ | ◎ | ◎ | ○ | ○ |
| Lubricity | ○ | ○ | x | x | Δ | Δ | Δ | Δ | ◎ | ◎ | □ | □ |
| Flexure resistance | ○ | ○ | ○ | ○ | ○ | ○ | ○ | ○ | ○ | ○ | x | □ |
| Acid resistance | ○ | ○ | ○ | ○ | ○ | ○ | ○ | ○ | ○ | ○ | ○ | ○ |
| Alkali resistance | ○ | ○ | ○ | ○ | ○ | ○ | ○ | ○ | ○ | ○ | ○ | ○ |
| Damaging property to prism | ○ | ○ | ○ | ○ | ○ | ○ | ○ | ○ | ○ | ○ | Δ | □ |
| Surface resistance value (Ω) | $10^{15}<$ | $10^{11}$ | $10^{15}<$ | $10^{11}$ | $10^{15}<$ | $10^{11}$ | $10^{11}$ | $10^{11}$ | $10^{11}$ | $10^{11}$ | $10^{15}<$ | $10^{15}<$ |

(Consideration)

With regard to the test pieces of Examples 1 to 35, abrasion resistance and lubricity were good and other properties were also almost good. Therefore, it was shown that the compositions of Examples 1 to 35 could be suitably used in the fields requiring abrasion resistance and lubricity. To the contrary, with regard to the test pieces of Comparative Examples 1 to 8 and 12, either abrasion resistance or lubricity was poor. Therefore, it was shown that the compositions of Comparative Examples 1 to 8 and 12 were not suitable for the use in the fields requiring abrasion resistance and lubricity. Moreover, with regard to the test pieces of Comparative Examples 9 to 11, abrasion resistance and lubricity were evaluated to be almost good, but other properties were poor. Therefore, it was shown that the compositions of Comparative Examples 9 to 11 were sometimes not suitable for the use in the fields requiring abrasion resistance and lubricity. For example, the test piece of Comparative Example 11 is inferior in flexure resistance, so that the composition of Comparative Example 11 is not suitable for the substrate requiring secondary processing.

In Examples 1 and 2, solvent resistance was slightly lower compared with those in Examples 3 to 35. Accordingly, it was shown that solvent resistance could be improved by changing the number of the isocyanate groups contained in the organic isocyanate (B) molecule used as a reaction raw material for the curable urethane (meth)acrylate from two to three or more.

In Comparative Examples 1 and 2 wherein a polycaprolactone-modified hydroxyethyl (meth)acrylate (D) was not used as a reaction raw material for the urethane (meth)acrylate, abrasion resistance and self-repairing function were extremely low. Accordingly, it was shown that abrasion resistance and self-repairing function could be improved by using the polycaprolactone-modified hydroxyethyl (meth)acrylate (D).

In Comparative Examples 3 and 4 wherein a long-chain alkyl alcohol (C) was not used as a reaction raw material for the urethane (meth)acrylate and Comparative Examples 5 and 6 wherein the long-chain alkyl alcohol (C) had 12 or less carbon atoms, lubricity and blocking property were low. Accordingly, it was shown that the long-chain alkyl alcohol (C) having 13 or more carbon atoms improves lubricity and blocking property.

In Comparative Examples 7 and 8 wherein a small amount of the long-chain alkyl alcohol was added, lubricity and blocking property of the curable composition were low and, in Comparative Examples 9 and 10 wherein a large amount of the long-chain alkyl alcohol was added, paint transparency and coated film transparency were low.

In Examples 21 to 23 wherein a long-chain alkyl alcohol (C) subjected to polyether modification was used, surface resistance value of the coated film had a tendency to decrease, and the surface resistance value further decreased by using the alkyl alcohol (C) and an antistatic agent in combination.

In the cases where the curable composition contained a compound (E) having an active energy ray-curable functional group (Examples 1, 2, 5, 8, 9, 11, 13, 14, 16, 18, 23, 27, 28, and 30 to 35), it was shown that adhesiveness and solvent resistance were improved.

In the curable compositions of Examples 33 to 35 containing a curable urethane (meth)acrylate having a polyether backbone and an antistatic agent (G) containing a lithium salt, it was shown that surface resistance value was one or two orders smaller than the curable compositions each containing other common antistatic agent (G) such as anionic, cationic, or nonionic one. This is because the lithium ion in the antistatic agent (G) interacts with the polyether backbone of the curable urethane (meth)acrylate.

In the curable compositions of Examples 33 and 35 wherein an active energy ray-reactive antistatic agent was used, there existed no possibility of the depression of function caused by bleed-out, so that the compositions were particularly preferred.

Example 36

A curable composition having 50% by weight of solid content was prepared from 100 parts of the urethane acrylate obtained in Synthesis Example 2, 20 parts of phthalic acid monohydroxyethyl acrylate (M-5400), 5 parts of dipentaerythritol hexaacrylate (M-400), 25 parts of toluene, and 3 parts of a photo-initiator (IRGACURE 184). The curable composition was applied onto a plasma-treated PET plate (a thickness of 100 μm) by spraying. After evaporation of the solvent, the PET plate was irradiated with a light of integral light intensity of 300 mJ/cm$^2$. Thereby, a layer (a thickness of 100 μm) comprising a cured curable composition was formed on the PET plate. Subsequently, a coating agent (Applying liquid A) containing 100 parts of OPSTAR JM5010 (manufactured by JSR Co., Ltd.) and 0.3 parts of a photo-initiator (IRGACURE 184) was applied onto the cured layer by spin coating. The coating agent was cured by irradiation with a light of integral light intensity of 400 mJ/cm$^2$ to form a layer (a thickness of 0.1 μm) having a low refractive index, whereby the desired antireflection film was obtained.

Example 37

A curable composition having 50% by weight of solid content was prepared from 100 parts of the urethane acrylate obtained in Synthesis Example 2, 20 parts of phthalic acid monohydroxyethyl acrylate (M-5400), 5 parts of dipentaerythritol hexaacrylate (M-400), 25 parts of toluene, and 3 parts of a photo-initiator (IRGACURE 184). The curable composition was applied onto a plasma-treated PET plate (a thickness of 100 μm) by spraying. After evaporation of the solvent, the curable composition was cured by irradiation with a light of integral light intensity of 300 mJ/cm$^2$ to form a layer (a thickness of 100 μm) comprising the curable composition. Subsequently, a coating agent (Applying liquid B) containing 10 parts of dipentaerythritol hexaacrylate (M-400), 100 parts of a titanium dioxide-dispersed liquid (15% toluene solution), 100 parts of toluene, and 0.3 parts of a photo-initiator (IRGACURE 184) was applied on the cured layer by spin coating. The coating agent was cured by irradiation with a light of integral light intensity of 600 mJ/cm$^2$ to form a layer (a thickness of 0.1 μm) having a medium refractive index. Furthermore, a coating agent (Applying liquid C) containing 10 parts of dipentaerythritol hexaacrylate (M-400), 200 parts of a titanium dioxide-dispersed liquid (15% toluene solution), and 0.3 parts of a photo-initiator (IRGACURE 184) was applied on the layer having a medium refractive index by spin coating, and the coating agent was cured by irradiation with a light of integral light intensity of 600 mJ/cm$^2$ to form a layer (a thickness of 0.1 μm) having a high refractive index. Finally, a coating agent (Applying liquid A) containing 100 parts of OPSTAR JM5010 and 0.3 parts of a photo-initiator (IRGACURE 184) was applied on the layer having a high refractive index by spin coating. The coating agent was cured by irradiation with a light of integral light intensity of 400 mJ/cm$^2$ to form a layer (a thickness of 0.1 μm) having a low refractive index, whereby the desired antireflection film was obtained.

Example 38

A coating agent (Applying liquid D) obtainable by dissolving perfluorotrimethoxysilane in a fluorinated solvent ("FLUORINERT FC-77", a trade name of 3M Co., Ltd.) was applied by spin coating on the layer having a low refractive index of the antireflection film obtained in Example 34 and was dried and cured to form an over-coating layer (a thickness of 0.1 μm), whereby the desired antireflection film was obtained.

Comparative Example 13

A coating agent obtainable by mixing 80 parts of dipentaerythritol hexaacrylate (M-400), 20 parts of tetrahydrofurfuryl acrylate, 100 parts of toluene, and 3 parts of a photo-initiator was applied onto a plasma-treated PET plate (a thickness of 100 μm) by means of a bar coater. After evaporation of the solvent, the coating agent was cured by irradiation with a light of integral light intensity of 600 mJ/cm$^2$ to form a hard-coating layer (a thickness of 5 μm). Subsequently, a coating agent (Applying liquid A) containing 100 parts of OPSTAR JM5010 and 0.3 parts of a photo-initiator (IRGACURE 184) was applied on the hard-coating layer by spin coating. The coating agent was cured by irradiation with a light of integral light intensity of 400 mJ/cm$^2$ to form a layer (a thickness of 0.1 μm) having a low refractive index, whereby the desired antireflection film was obtained.

Comparative Example 14

A coating agent obtainable by mixing 80 parts of dipentaerythritol hexaacrylate (M-400), 20 parts of tetrahydrofurfuryl acrylate, 100 parts of toluene, and 3 parts of a photo-initiator was applied onto a plasma-treated PET plate (a thickness of 100 μm) by means of a bar coater. After evaporation of the solvent, the coating agent was cured by irradiation with a light of integral light intensity of 600 mJ/cm$^2$ to form a hard-coating layer (a thickness of 5 μm). Subsequently, a coating agent (Applying liquid B) containing 10 parts of dipentaerythritol hexaacrylate (M-400), 100 parts of a titanium dioxide-dispersed liquid (15% toluene solution), 100 parts of toluene, and 0.3 parts of a photo-initiator (IRGACURE 184) was applied on the hard-coating layer by spin coating. The coating agent was cured by irradiation with a light of integral light intensity of 600 mJ/cm$^2$ to form a layer (a thickness of 0.1 μm) having a medium refractive index. Furthermore, a coating agent (Applying liquid C) containing 10 parts of dipentaerythritol hexaacrylate (M-400), 200 parts of a titanium dioxide-dispersed liquid (15% toluene solution), and 0.3 parts of a photo-initiator (IRGACURE 184) was applied on the layer having a medium refractive index by spin coating, and the coating agent was cured by irradiation with a light of integral light intensity of 600 mJ/cm$^2$ to form a layer (a thickness of 0.1 μm) having a high refractive index. Finally, a coating agent (Applying liquid A) containing 100 parts of OPSTAR JM5010 and 0.3 parts of a photo-initiator (IRGACURE 184) was applied on the layer having a high refractive index by spin coating. The coating agent was cured by irradiation with a light of integral light intensity of 400 mJ/cm$^2$ to form a layer (a thickness of 0.1 μm) having a low refractive index, whereby the desired antireflection film was obtained.

Comparative Example 15

A coating agent comprising 100 parts of polycaprolactone tetraol ("PLACCEL 410D", a trade name of Daicel Chemical Industries, Ltd.), 75 parts of hexamethylene diisocyanate (D-170N), and 75 parts of toluene was applied onto a plasma-treated PET plate (a thickness of 100 μm) by spraying, and was dried at 140° C. for 30 minutes to form a soft polyurethane layer (a thickness of 100 μm). Subsequently, a coating agent (Applying liquid A) containing 100 parts of OPSTAR JM5010 and 0.3 parts of a photo-initiator (IRGACURE 184) was applied on the soft polyurethane layer by spin coating. The coating agent was cured by irradiation with a light of integral light intensity of 400 mJ/cm$^2$ to form a layer (a thickness of 0.1 μm) having a low refractive index, whereby the desired antireflection film was obtained.

On each of the antireflection films of Examples 36 to 38 and Comparative Examples 13 to 15, average reflectance was measured and also impact resistance, flexure resistance, and productivity were evaluated. The results are shown in Table 8. Average reflectance is a value in the range of 450 to 650 nm on a spectrophotometer. Impact resistance was evaluated by examining under conditions of 1/4 φ and 500 g×50 cm using a Du Pont-type impact-testing machine. Flexure resistance was evaluated by folding a test plate (an antireflection film) to 0T. Productivity was represented by a symbol ○ in the case where the film was producible (curing and drying) by the second and a symbol X in the case where the film was producible by the minute. Each of Applying liquids A to D was applied onto a silicon wafer by spin coating and the refractive index was measured by an ellipsometer. The refractive indexes of Applying liquids A, B, C, and D were found to be 1.36, 1.71, 1.90, and 1.35, respectively.

TABLE 8

|  | Example 36 | Example 37 | Example 38 | Comparative Example 13 | Comparative Example 14 | Comparative Example 15 |
|---|---|---|---|---|---|---|
| Average reflectance | 1.71% | 1.08% | 0.62% | 1.74% | 1.04% | 1.69% |
| Impact resistance | ○ | ○ | ○ | X | X | ○ |
| Flexure resistance | ○ | ○ | ○ | X | X | ○ |
| Productivity | ○ | ○ | ○ | ○ | ○ | X |

INDUSTRIAL APPLICABILITY

The active energy ray-curable urethane (meth)acrylate and active energy-ray curable composition of the present invention can be used as coating agents and paints having abrasion resistance and lubricity.

What is claimed is:

1. An active energy ray-curable urethane (meth)acrylate which has an alkyl group having 13 to 25 carbon atoms and an active energy ray-curable functional group and is modified with polycaprolactone.

2. The active energy ray-curable urethane (meth)acrylate according to claim 1, which is obtained by reacting an organic isocyanate having three or more isocyanate groups in one molecule, an alkyl alcohol having 13 to 25 carbon atoms, and a polycaprolactone-modified hydroxyethyl (meth)acrylate.

3. The active energy ray-curable urethane (meth)acrylate according to claim 2, wherein the molar ratio of the isocyanate group of the organic isocyanate, the hydroxyl group of the polycaprolactone-modified hydroxyethyl (meth)acrylate, and the hydroxyl group of the alkyl alcohol is 1:0.8 to 1.20:0.02 to 0.33.

4. An active energy-ray curable composition comprising:
   an active energy ray-curable urethane (meth)acrylate which has an alkyl group having 13 to 25 carbon atoms and an active energy ray-curable functional group and is modified with polycaprolactone; and
   at least one compound selected from the group consisting of organic beads, inorganic beads, an antistatic agent, and a compound having an active energy ray-curable functional group copolymerizable with the urethane (meth)acrylate.

5. A functional material obtained by curing an active energy ray-curable urethane (meth)acrylate which has an alkyl group having 13 to 25 carbon atoms and an active energy ray-curable functional group and which is modified with polycaprolactone, wherein said curing is by irradiation with an active energy ray.

6. A functional material obtained by curing active energy-ray curable composition by irradiation with an active energy ray, the composition comprising:
   an active energy ray-curable urethane (meth)acrylate which has an alkyl group having 13 to 25 carbon atoms and an active energy ray-curable functional group and is modified with polycaprolactone; and
   at least one compound selected from the group consisting of organic beads, inorganic beads, an antistatic agent, and a compound having an active energy ray-curable functional group copolymerizable with the urethane (meth)acrylate.

7. A light-diffusive sheet comprising:
   a substrate sheet; and
   a cured layer made of an active energy ray-curable urethane (meth)acrylate, which is formed on a surface of the substrate sheet.

8. A light-diffusive sheet comprising:
   a substrate sheet; and
   a cured layer made of an active energy ray-curable composition, which is formed on a surface of the substrate sheet.

9. An antireflection film comprising:
   a substrate film;
   a cured layer made of an active energy ray-curable urethane (meth)acrylate, which is formed on a surface of the substrate film; and
   an antireflection layer provided on the cured layer.

10. An antireflection film comprising:
    a substrate film;
    a cured layer made of an active energy ray-curable composition, which is formed on a surface of the substrate film; and
    an antireflection layer provided on the cured layer.

11. An active energy ray-curable urethane (meth)acrylate which has an alkyl group having 13 to 25 carbon atoms and terminal methylene group and wherein said active energy ray-curable urethane (meth)acrylate is modified with polycaprolactone.

12. A process for producing an active energy ray-curable urethane (meth)acrylate comprising steps of:
    mixing an organic isocyanate having three or more isocyanate groups in one molecule, an alkyl alcohol having 13 to 25 carbon atoms;
    heating the mixture;
    adding a polycaprolactone-modified hydroxyethyl (meth)acrylate to the mixture; and
    maintaining the mixture at 70° C. for 3 hours.

* * * * *